(12) United States Patent
Yang (10) Patent No.: US 7,133,179 B2
(45) Date of Patent: Nov. 7, 2006

(54) FAST SCANNER WITH ROTATABLE MIRROR AND IMAGE PROCESSING SYSTEM

(76) Inventor: Yuping Yang, 3252 Leesville Way, Dublin, OH (US) 43017

( * ) Notice: Subject to any disclaimer, the term of this patent is extended or adjusted under 35 U.S.C. 154(b) by 0 days.

(21) Appl. No.: 11/390,093

(22) Filed: Mar. 28, 2006

(65) Prior Publication Data

US 2006/0171010 A1 Aug. 3, 2006

Related U.S. Application Data

(63) Continuation-in-part of application No. 10/960,791, filed on Oct. 7, 2004.

(60) Provisional application No. 60/773,180, filed on Feb. 14, 2006, provisional application No. 60/667,034, filed on Apr. 1, 2005, provisional application No. 60/572,639, filed on May 19, 2004, provisional application No. 60/531,249, filed on Dec. 19, 2003, provisional application No. 60/510,185, filed on Oct. 10, 2003.

(51) Int. Cl.
*G02B 26/08* (2006.01)

(52) U.S. Cl. .................................................. 359/214
(58) Field of Classification Search ............... 359/205, 359/208, 209, 212–214
See application file for complete search history.

(56) References Cited

U.S. PATENT DOCUMENTS 4,174,904 A * 11/1979 Murasaki et al. ........... 399/203

* cited by examiner

*Primary Examiner*—Euncha P. Cherry
(74) *Attorney, Agent, or Firm*—Rosenberg, Klein & Lee (57) ABSTRACT

A scanner for obtaining an image of an object placed on an at least partially transparent platform, wherein the platform has at least a first scan area and a second scan area. The scanner includes a white area formed at least partially around the edge portions of the platform with a plurality of markers, one rotatable mirror, one or more image sensors. In scanning, each partial image from each of the scan areas includes an image of at least one portion of the plurality of markers. An image processing system uses the image of the at least one portion of the plurality of markers in each of the consecutive partial images as a reference to combine the consecutive partial images so as to form a substantially complete image of the object corresponding to a full scan of the first scan area and the second scan area.

14 Claims, 9 Drawing Sheets

FAST SCANNER WITH ROTATABLE MIRROR AND IMAGE PROCESSING SYSTEM

RELATED APPLICATIONS

This application is a continuation-in-part patent application of U.S. application Ser. No. 10/960,791, filed Oct. 7, 2004, entitled "FAST SCANNER WITH ROTATABLE MIRROR AND IMAGE PROCESSING SYSTEM", the disclosure of which is hereby incorporated herein by reference in its entirety, which itself claims the benefit, pursuant to 25 U.S.C. §119(e), of provisional U.S. patent application Ser. Nos. 60/510,185, 60/531,249, and 60/572,639, filed on Oct. 10, 2003, Dec. 19, 2003 and May 19, 2004, respectively, entitled "FAST SCANNER WITH ROTARY MIRROR AND IMAGE PROCESSING SYSTEM," by Yuping Yang, which are incorporated herein by reference in their entireties. This application also claims the benefit of provisional US. Patent application Ser. Nos. 60/667,034 and 60/773,180, filed on Apr. 1, 2005 and Feb. 14, 2006, entitled "FAST SCANNER WITH ONE ROTATABLE MIRROR AND IMAGE PROCESSING SYSTEM" by Yuping Yang.

Some references, which may include patents, patent applications and various publications, are cited in a reference list and discussed in the description of this invention. The citation and/or discussion of such references is provided merely to clarify the description of the present invention and is not an admission that any such reference is "prior art" to the invention described herein. All references cited and discussed in this specification are incorporated herein by reference in their entireties and to the same extent as if each reference was individually incorporated by reference.

FIELD OF THE INVENTION

The present invention generally relates to an image scanning device, and in particular an image scanning device that utilizes at least one image sensor and at least one rotatable mirror for high speed image scanning and the utilization of a known image for high speed image processing.

BACKGROUND OF THE INVENTION

Today, two types of image scanning devices are commonly available for converting paper documents into electronic images. The first type is a flatbed scanner, which scans document placed on a flat transparent glass or plastic window. The second type is a sheet-feed scanner, which feeds pages of documents, one page at a time, through a thin slot on the scanner to be scanned. Currently, the image scan speed of sheet-feed scanners is usually much faster than that of the flatbed scanners. In flatbed scanners, one critical limiting factor for scan speed is the mechanical movement speed of the scan head in the scanner. A fast back and forth and start-and-stop movement of the scan head can create a level of vibration that hurts the image quality of the flatbed scanner. Alternative to scan head, a rotatable mirror may work as a scan mechanism in a flatbed scanner.

The reduction of the vertical dimension of flatbed scanner while keep a large scan area, so that the scanner has a "thin" physical profile is very important for the flatbed scanner as a commercial product. One way of addressing this problem is to use multiple rotatable mirrors, each scanning a different region of the scan area to achieve a "thin" scanner design. This method is described in U.S. application Ser. No. 10/960,791.

It is desirable to use fewer rotatable mirrors, preferably one rotatable mirror, for simple mechanism structure and low cost of the flatbed scanner.

The current invention provides a solution to use fewer rotatable mirrors, preferably one, in flatbed scanner design.

SUMMARY OF THE INVENTION

The present invention, in one aspect, relates to a scanner for obtaining an image of an object placed on an at least partially transparent platform. The at least partially transparent platform has a first scan area and a second scan area, and each of the first scan area and the second scan area has a first edge and a second edge, respectively.

Figure 2:
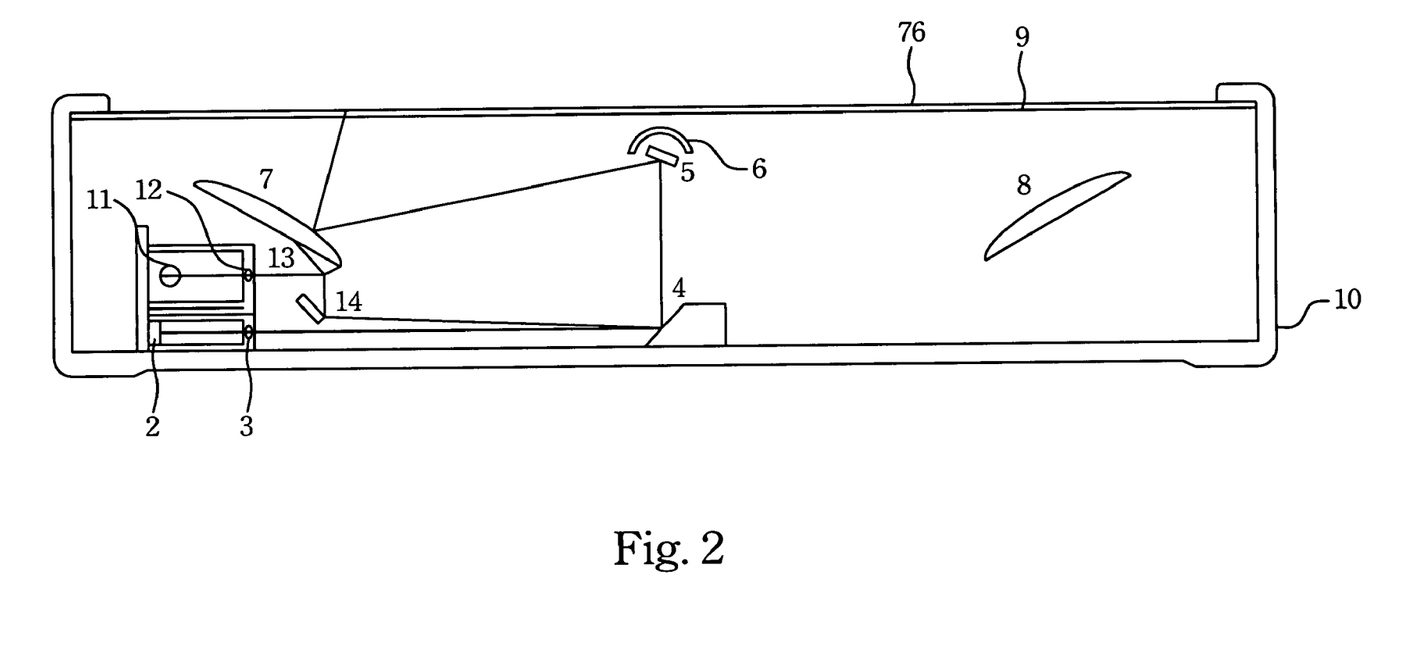
FIG. 2 shows schematically a side view of the scanner shown in FIG. 1.

The scanner has a light source. The scanner further has at least one rotatable mirror adapted for receiving the light from a first direction and reflecting the light to a second direction to one of two planar or curved stationary mirrors. The light reflecting off the planar or curved stationary mirrors travels in a third direction to illuminate the object on the at least partially transparent platform 9 as shown in FIG. 2. Referring to FIG. 2, the first direction is from mirror 4 to rotatable mirror 5, the second direction is from rotatable mirror 5 to stationary mirror 7 or 8, and the third direction is from the stationary mirror 7 or 8 to the object on the top surface 76 of the at least partially transparent platform 9. A portion of the light reflects off the object on the platform 9 travels in a fourth direction, which is opposite or nearly opposite to the third direction and reaches the planar or curved stationary mirror 7 or 8. The light received from the fourth direction reflects off the mirror 7 or 8 into a fifth direction that is opposite or nearly opposite to the second direction. The light travels in the fifth direction further reflects off rotatable mirror 5 into a sixth direction that is opposite or nearly opposite to the first direction, and eventually, possibly with further mirror reflections, and through focusing lens or lens assembly 3, reaches the optical line sensor 2 of the scanner. Line sensor 2 receives the image light from the object and outputs electronic signals corresponding to the received images of the object. Referring to FIG. 2, hereinafter, the portion of the light that reflects off the object on the platform 9, which represents the image of the object to be scanned, will be called image light and its corresponding optical path the image optical path. Image optical path starts from the object on platform 9 and ends in the image sensor.

Furthermore, the scanner may have other stationary mirrors, such as 13 and 14 in FIG. 2, for receiving illuminating light beam from light source 11 so that after the reflections of these mirrors, the optical path of the illuminating light beam is closely aligned with image optical path and in opposite or nearly-opposite directions to the image light.

Referring to FIG. 2, the rotatable mirror 5 and the planar or curved stationary mirrors 7 or 8 are arranged in such a way that when the rotatable mirror is rotated, it causes the second direction of the illuminating light to change such that the corresponding light reflected from the stationary mirror 7 or 8 travels along a third direction sequentially scans partial images of the object in the first scan area and the second scan area consecutively. While the rotatable mirror rotates, image light in the fourth direction scans through the object placed on the platform 9. An image processing system, which can be part of the scanner, or in the form of software resides in a separate computer system outside the scanner, combines the partial images recorded therein to form a substantially complete image of the object. Referring to FIG. 2, the rotation of the rotatable mirror 5 accomplishes the illuminating light scan as well as the image light scan simultaneously, and in the first scan area and the second scan area consecutively.

Referring to FIG. 6, in one embodiment, the at least one light source, the at least one rotatable mirror and the at least one image sensor are arranged in such a way that the first direction and the sixth direction define a first angle, (180°−β), and the second direction and the fifth direction define a second angle, (180°+β), and the third direction and the fourth direction define a third angle, (180°−β+α), where β has a value in a range of −20° to +20°, and α has a value between −10° to +10°. When rotates, the at least one rotatable mirror causes the second direction of the light to change such that the illuminating light sequentially scans consecutive partial images of the object. During scanning of a scan area, β is a constant while the value of α depends on the shape of the reflective surfaces of mirrors 7 and 8. If mirror 7 and 8 are flat mirrors, then α=0. If mirror 7 is a curved mirror, the value of a can be varying during scanning when the image light reflects off mirror 7. A similar relationship exists between the shape of mirror 8 and the value of α.

In another aspect, Referring to FIG. 2, the at least partially transparent platform 9 is defined by edge portions and has at least a first scan area and a second scan area. The edge portion of the platform 9 includes a white area with a plurality of markers, or one or more sections of continuous long marker patterns. The markers or long marker patterns are placed and identifiable at predetermined locations in the white area. In one embodiment, at least one portion of the white area is adapted as a standard white whose image is used by the image processing system of the scanner for standard white reference. The method further includes a step of sequentially scanning consecutive partial images of the object, where each of the consecutive partial images includes an image of at least one of the plurality of markers or sections of long marker patterns. Moreover, the method includes the step of using the image of the at least one of the plurality of markers or at least one section of long marker patterns in each of the consecutive partial images as a reference to combine the consecutive partial images so as to form a substantially complete image of the object corresponding to a full scan of the first scan area and the second scan area. The using step further includes the steps of correcting the distortion of the formed image of the object and trimming off the image of the white area and the image of markers or long marker patterns, respectively, from the image of the object so as to obtain an undistorted, complete image of the object.

These and other aspects of the present invention will become apparent from the following description of the preferred embodiment taken in conjunction with the following drawings, although variations and modifications therein may be affected without departing from the spirit and scope of the novel concepts of the disclosure.

BRIEF DESCRIPTION OF THE DRAWINGS

FIG. 6 (1) illustrates the angle between the first direction and the sixth direction on light paths.

FIG. 6 (2) illustrates the angle between the second direction and the fifth direction on light paths.

FIG. 6 (3) illustrates the angle between the third direction and the fourth direction on light paths.

DETAILED DESCRIPTION OF THE INVENTION

Referring to the drawings, like numbers indicate like components throughout the views. As used in the description herein and throughout the claims that follow, the meaning of "a", "an", and "the" includes plural references unless the context clearly dictates otherwise. Also, as used in the description herein and throughout the claims that follow, the meaning of "in" includes "in" and "on" unless the context clearly dictates otherwise. The description will be made as to the embodiments of the present invention in conjunction with the accompanying drawings.

The scanner mentioned in this description includes flatbed image scanners, the scan mechanism of the copier machines, and the (scanner-printer-copier-fax, etc.) all-in-one machines.

Figure 1:
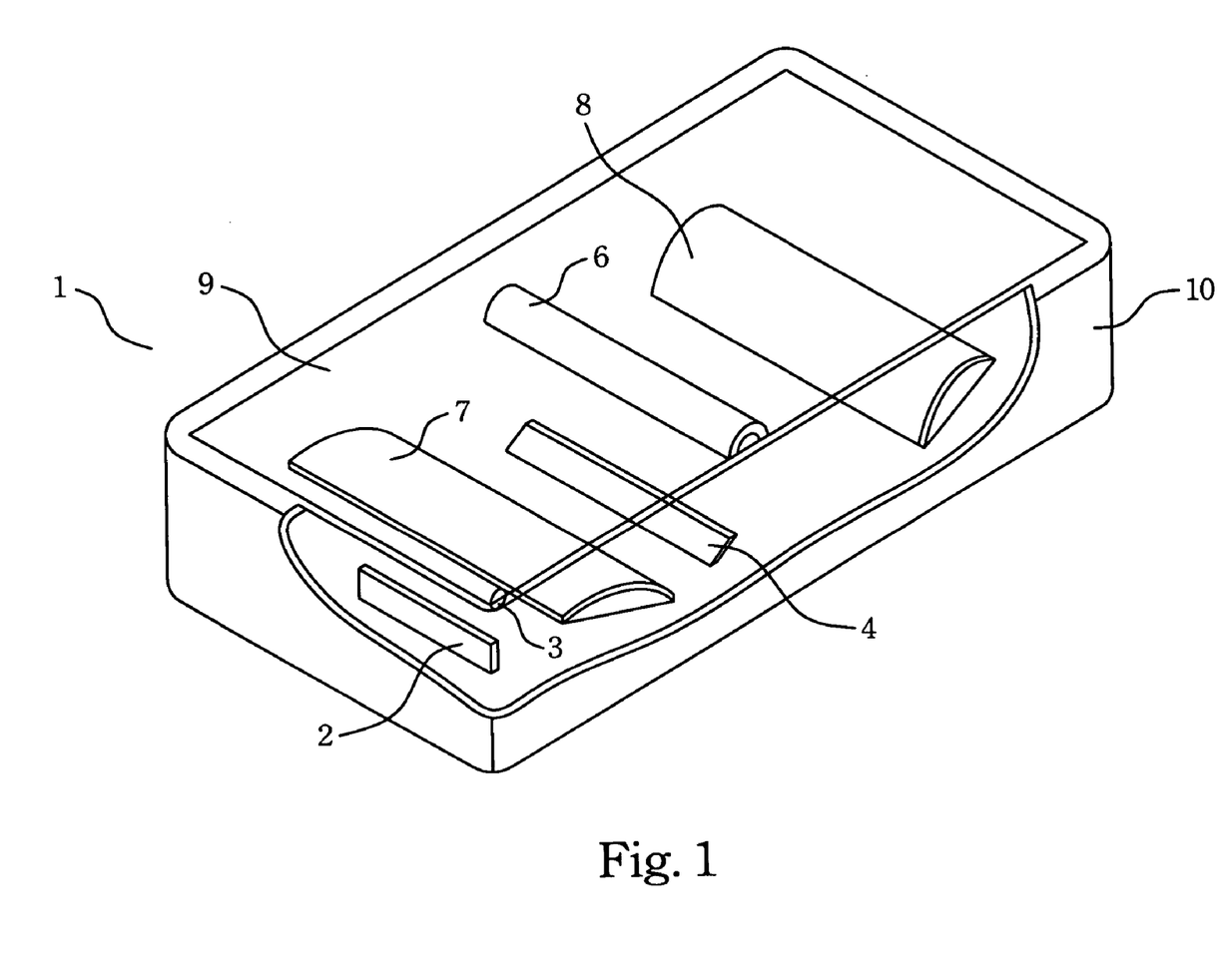
FIG. 1 shows a perspective view of a rotatable mirror based scanner of the present invention.

FIG. 1 shows a perspective view of one embodiment of the present invention. The scan device 1 has a image line sensor 2, a focusing lens or lens assembly 3, a stationary mirror 4, a rotatable mirror 5 (not shown) inside the light shield 6, two stationary mirrors 7 and 8, an at least partially transparent platform 9, and case 10.

FIG. 2 schematically shows a side view of the scan device in FIG. 1. FIG. 2 also shows one embodiment of the illuminating subsystem, which includes light source 11, focusing lens or lens assembly 12, stationary mirrors 13, 14, and 4, rotatable mirror 5, and two stationary mirrors 7 or 8. FIG. 2 also shows the line image sensor 2 and focusing lens or lens assembly 3.

Referring to FIG. 2, lens 12 is a cylindrical lens or lens assembly while lens 3 is an image focusing lens or lens assembly.

In operation, illuminating light emitted from light source 11 passes through lens or lens assembly 12, reflected off stationary mirror 13, 14, 4, reaches the rotatable mirror 5 in the first direction. Mirror 5 rotates during image scanning along an axis substantially parallel to the at least partially transparent platform 9 and the line image sensor 2. In a certain angular range, the illuminating light coming from the first direction is reflected off the rotatable mirror 5 and scans the surface of mirror 7 or 8 in a second direction. The illuminating light reflected off mirror 7 or 8 reaches the object placed on the top surface 76 of the partially transparent platform 9 in a third direction.

The image light reflected off the object placed on the top surface 76 of the at least partially transparent platform 9 reaches stationary mirror 7 or 8 in a fourth direction. The image light then reflects off mirror 7 or 8 and reaches the rotatable mirror 5 in a fifth direction, and then reaches stationary mirror 4 in the sixth direction, and then be reflected off mirror 4, passing through the focusing lens or lens assembly 3, finally reaches the line image sensor 2. A light shield 6 prevents the light coming from the rotatable mirror 5 from escaping out of the platform 9 and directly shining into the eyes of human operators during image scanning operation.

The image light originates from a region with the shape of narrow band, hereinafter will be called image band region, on the platform 9 at any moment during a scanning. The image band region is substantially parallel to the rotation axis of mirror 5. The illuminating light illuminates a region with the shape of a narrow band, hereinafter will be called illuminating band region, on the platform 9 at any moment during a scanning. The rotation of mirror 5 causes both the image band region and the illuminating band region move on the platform 9 in a direction which is perpendicular to the rotation axis of mirror 5.

Referring to FIG. 2, the scan device has two scan areas. To the left of the rotatable mirror 5 is the first scan area and to the right of the rotatable mirror 5 is the second scan area. The first scan area has a first edge and a second edge and the second scan area has a first edge and a second edge. The second edge of the first scan area and the first edge of the second scan area are slightly overlapped. The overlapped portion of the scan areas is located approximately in the middle of the whole scan area, above the rotatable mirror 5. Through the use of stationary mirrors 7 and 8, the present invention allows one rotatable mirror to scan both the first scan area and the second scan area.

FIG. 1 and FIG. 2 show one embodiment of the present invention. Many variations can be made to the design without departing from the principles of the present invention. As examples, in another embodiment, light source 11 can be positioned below image sensor 2. In still another embodiment, both the light source 11 and image sensor 2 can be placed further away, horizontally, from the middle of the scanner, so that the mirrors 7 and 8 can be placed below the positions of light source 11 and image sensor 2, to allow larger vertical distance between the mirrors 7 and 8 and the at least partially transparent platform 9. In still another embodiment, light source 11 can be placed on one side, horizontally, of the rotatable mirror 5 and the line image sensor 2 can be placed on the other side, horizontally, of the rotatable mirror 5. FIG. 1 and FIG. 2 only show one of numerous possible different embodiments.

Stationary mirrors 7 and 8 can have flat reflection surface or curved reflection surface. For the same size and dimensions of the scan area, the scan device made with the curved surface mirrors 7 and 8 can have a smaller vertical dimension than the scan device made with flat surface mirrors 7 and 8.

Mirrors 13 and 14 are used to align the illuminating optical path so that it is very close to the image optical path. In different embodiments of the present invention, there can be different physical arrangements to place the light source, the at least one line image sensor, and the mirrors to allow the image optical path and the illuminating light path be close. With all these arrangements, the image light and the illuminating light are in opposite or nearly opposite directions.

FIG. 2 shows that an angle exists between the segment 14-4 of the illuminating optical path and the segment 4-3-2 of the image optical path. Because the illuminating optical path and the image optical path use the same set of mirrors 4, 5, 7 or 8, the above mentioned angle between the two optical paths exists in other segments of the optical paths as well.

Referring to FIG. 2, the illuminating optical path in segment 4-5 is in the first direction and the image optical path in segment 5-4 is in the sixth direction. As shown in FIG. 6 (1), the angle from the first direction to the sixth direction is $(180°-\beta)$, where $\beta$ has a constant value during scanning and is in the range of $-20°$ to $20°$. The illuminating optical path in segment of optical paths 5-7 or 5-8 is in a second direction and the image optical path in segment of optical paths 7-5 or 8-5 is in a fifth direction. As shown in FIG. 6 (2), the angle from the second direction to the fifth direction is $(180°+\beta)$. The illuminating optical path from mirror 7 or 8 to object is in a third direction and the image optical path from object to mirror 7 or 8 is in a fourth direction. If mirrors 7 and 8 are planar mirrors, the angle from the third direction to the fourth direction is $(180°-\beta)$. If mirror 7 is a curved surface mirror, illuminating light path and the image light path can hit the surface of mirror 7 at different locations, the angle from the third direction to the fourth direction is $(180°-\beta+\alpha)$, where $-10°\leq\alpha\leq+10°$ and $\alpha$ can be varying during the scanning.

Figure 7:
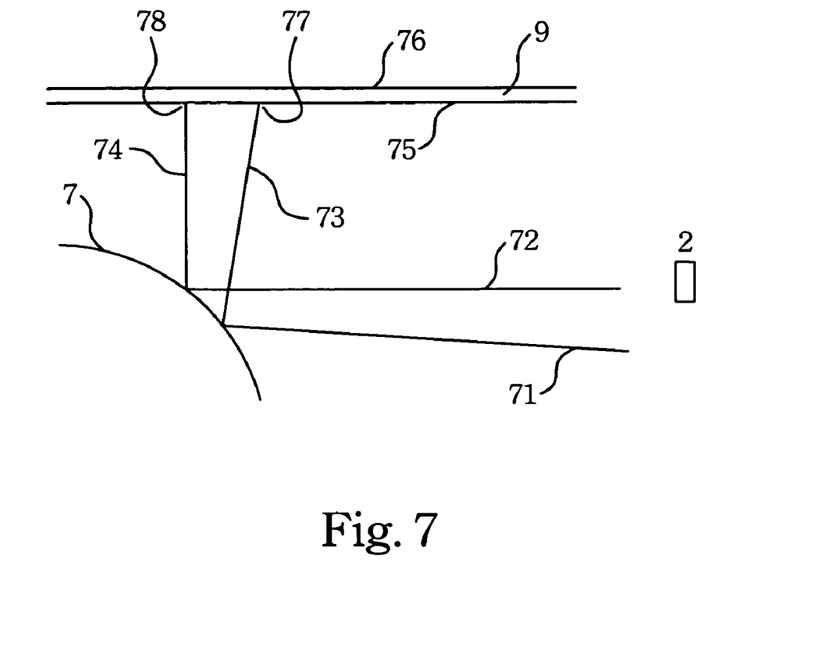
FIG. 7 schematically illustrates the positions and angles between the illuminating optical path 71-73, and the image optical path 74-72, along with the curved reflective surface of a stationary mirror 7.

Referring to FIG. 7, illuminating light travels through illuminating optical path 71 in a second direction is reflected off mirror 7 into a third direction along optical path 73, reaches the at least partially transparent platform 9 at location 77. The illuminating light illuminates a region of narrow band, the illuminating band region, centered at location 77. The illuminating band region has a width, so a narrow band region, the image band region, centered at location 78 on platform 9 is also illuminated. The object on the image band region reflects a portion of the illuminating light it received. This reflected light represents the image of the object and hereinafter will be referred to as image light. The image light travels along image optical path 74 in a fourth direction and is reflected off mirror 7 to a fifth direction along optical path 72. The image light eventually reaches image sensor 2. FIG. 7 is exaggerated to show that the centers 77 and 78 of the illuminating band region and the image band region, respectively, can be at different locations on the platform 9.

Figure 8:
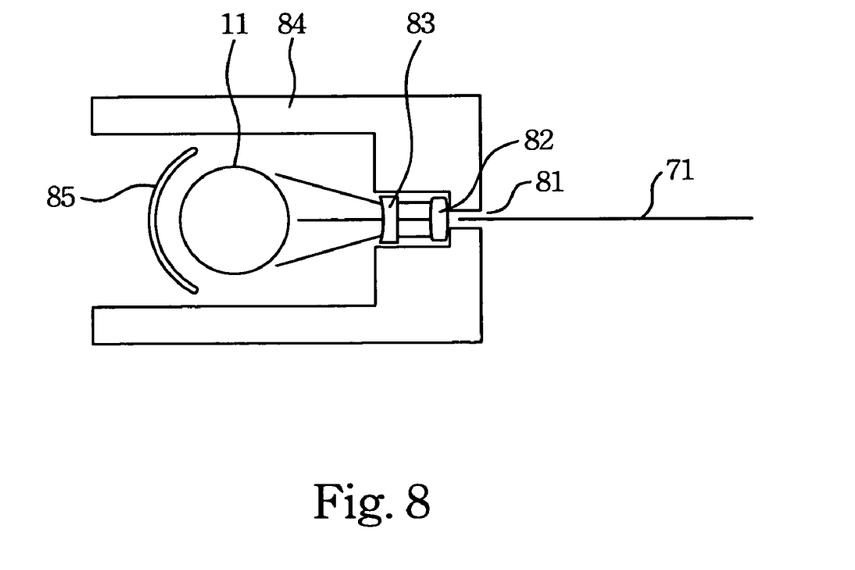
FIG. 8 shows one embodiment of a light source assembly.

FIG. 8 shows one embodiment of the light source assembly to emit a sufficiently narrow band of illuminating light beam 71. Referring to FIG. 8, a frame 84 holds various components of the light source assembly. The light emitted from light source 11 is concentrated by the reflective hood 85 to form a directional light band. The directional light band passes through lens 83 and 82, through opening 81, to form a sufficiently narrow band of light beam 71, which is used to illuminate the object to be scanned.

Figure 9:
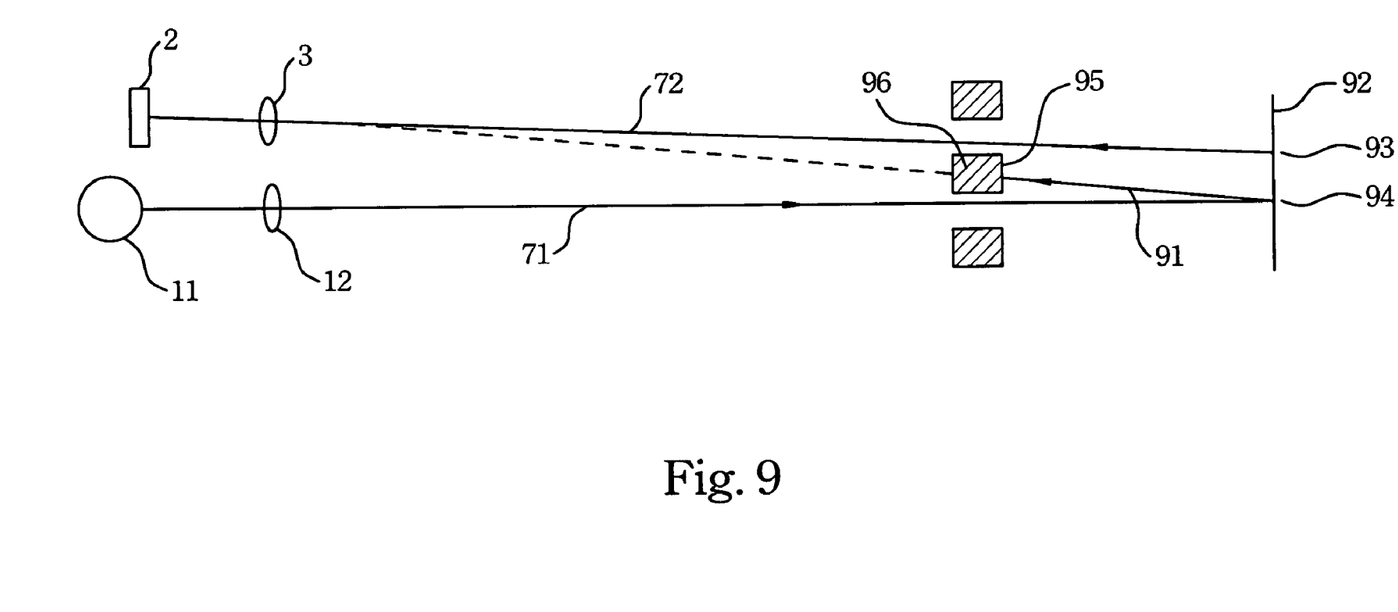
FIG. 9 schematically illustrates the angles between illuminating optical path 71, strong direct reflecting optical path 91, image optical path 72, and a blocker 96 for blocking the strong direct reflecting light 91 from directly entering optical image sensor 2 as shown in FIG. 2.

FIG. 9 is a schematic diagram to show optical paths in the device when these optical paths are unfolded, that is, when these optical paths are allowed to be full stretched without using mirrors. Since all optical paths pass through the same set of mirrors, a description of the relationships of positions and angles of various optical paths as shown in FIG. 9 is representative of the relationships of the positions and angles of various optical paths when mirrors are used as shown in FIG. 1 and FIG. 2. Referring to FIG. 9, an illuminating light emits from light source 11, passes through lens or lens assembly 12 and travels along an illuminating optical path 71 to reach a surface 92 of the at least partially transparent platform at location 94. 92 can either be the top surface 76 of the platform 9 or the bottom surface 75 of the at least partially transparent platform. In either case, the description is the same.

Image optical path originates from location 93 on the surface 92 and travels along image optical path 72, passes through focusing lens or lens assembly 3 to enter image sensor 2. Image light is only a portion of the reflected light of the illuminating light travels along optical path 71. At certain position during scanning, illuminating light is at or almost at perpendicular direction to surface 92. Referring to FIG. 7, this situation happens when optical path is at or almost at perpendicular direction to platform 9. At this position, strong direct reflection light, originates from location 94 and is caused by the illuminating light, because of the principle of incidence angle equals the reflection angle, may travel along optical path 91, hereinafter will be called strong direct reflection optical path, to enter image sensor 2. It is desirable to prevent the strong direct reflection light from entering into the image sensors.

Because of the use of focusing lens or lens assembly 3, only image light originated from location 93 on the surface 92 can be sharply focused into image sensor 2. The small view angle of the image sensor 2 alleviates the effect that the strong direct reflection light travels in strong direct reflection optical path 91 may overwhelm the optical signal received by image sensor 2.

Optionally, an opaque blocker 96 can be placed on the strong direct reflection optical path 91 to block the strong direct reflection light originated at location 94 on the surface 92 from entering into image sensor 2. Referring to FIG. 2, the blocker 96 can be placed in a place close to image optical path 3-4 or image optical path 4-5. Referring to FIG. 9, in one embodiment, the blocker 96 can be made as a solid and opaque disk with two holes, one is used to allow image light to pass through along image optical path 72 and the other hole is used to allow illuminating light to pass through along illuminating optical path 71. In another embodiment, the blocker 96 can be made as a solid and opaque bar that is placed between the illuminating optical path 71 and the image optical path 72. The strong direct reflection light when illuminating light is almost perpendicular to the surface 92 hits the blocker at location 95 and is blocked. The blocker 96 can be coated with dark and light absorbing material. In other embodiments, the blocker 96 can be made with many other shapes and material as well. All these embodiments of blocker 96 allow the passing of illuminating light along illuminating optical path 71 and the passing of image light along image optical path 72, and block the strong direct reflection light travels along strong direct reflection optical path 91.

To reduce the intensity of reflection light from the top or bottom surfaces of the at least partially transparent platform 9 on the scanner, the top or bottom surface of the platform 9 can be coated with anti-reflective coating.

Software calibration using software to process and to restore the perfect image of the to-be-scanned object can be used to compensate the imperfection of the manufacturing of the curved surfaces of mirrors 7 and 8 and the many other mirrors and lenses in the device. This software calibration can be done after the hardware of the device is made. In practice, the software calibration can be achieved by placing a sheet with perfect grid lines on top of the at least partially transparent platform to be scanned and the software processing is used to restore the scanned and distorted grid line images to perfect grid lines as on the original sheet. After the processing is done, the result of the processing can be stored in the scanner, or in a computer system associated with the scanner for later use.

Figure 3:
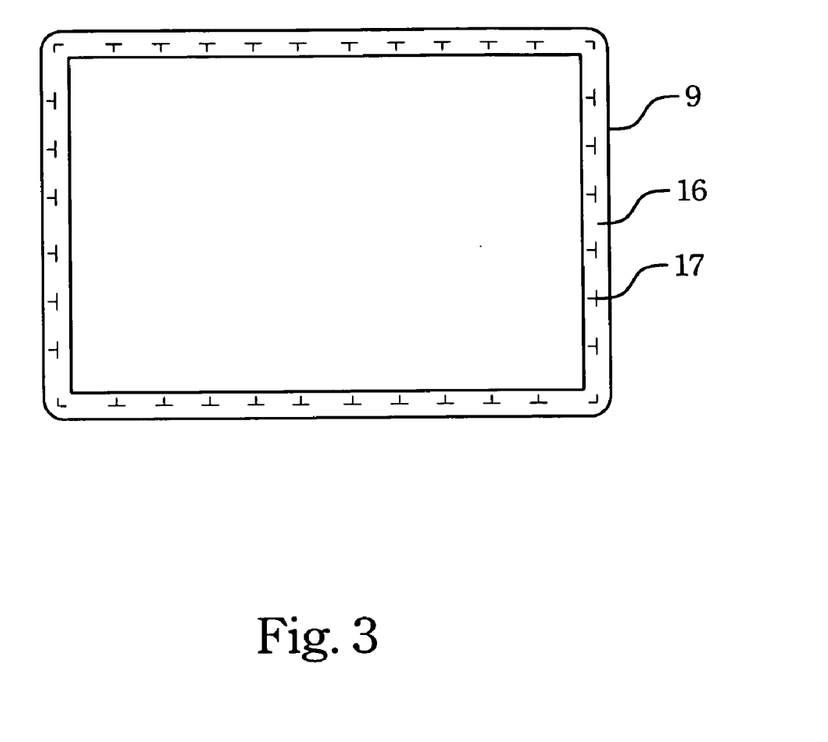
FIG. 3 shows schematically a bottom view of an at least partially transparent platform having a white area with a plurality of markers according to one embodiment of the present invention.

FIG. 3 shows a bottom view of the at least partially transparent platform 9. 16 is a white area that substantially surrounds the edge of the platform 9. At least a portion of the white area 16 must have the color of standard white whose image that are used by the imaging system as the standard white reference for shading correction in image processing.

The images of the markers or long continuous mark patterns 17, on the white area 16 are used in the image processing system for image distortion eliminating and partial image combining. Markers can be used to identify the locations of the areas during shading correction.

Figure 4:
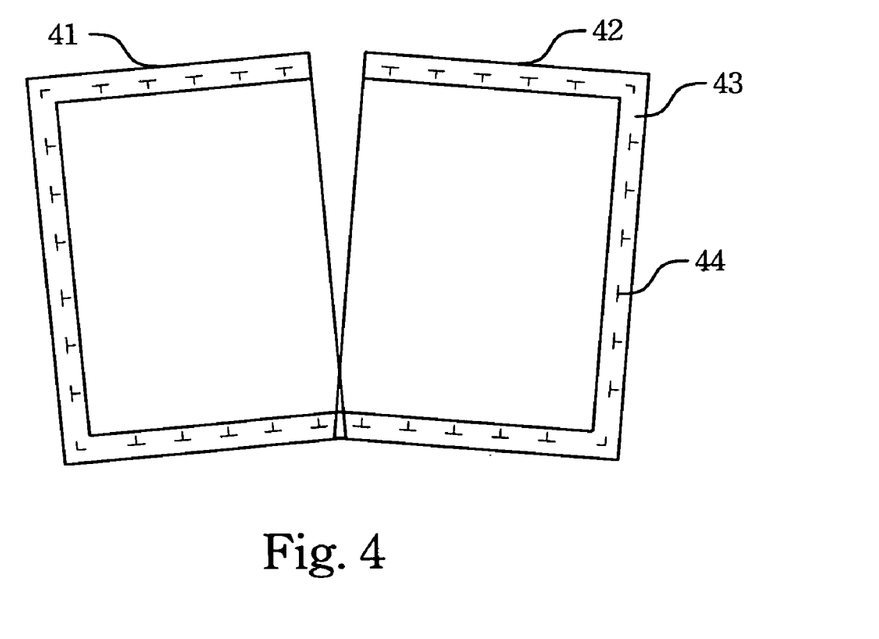
FIG. 4 schematically illustrates the combining of two partial images using the images of common markers according to one embodiment of the present invention.

FIG. 4 shows two partial images 41 and 42, one is obtained from the first scan area and the other is obtained from the second scan area. The image processing system relies on the images 44 of the markers, or long mark patterns, on the image 43 of white band on the partial images to "stitch" these partial images together. The images 43 of the white area and the images 44 of the markers will be trimmed off from the combined image after image processing is done.

Figure 5:
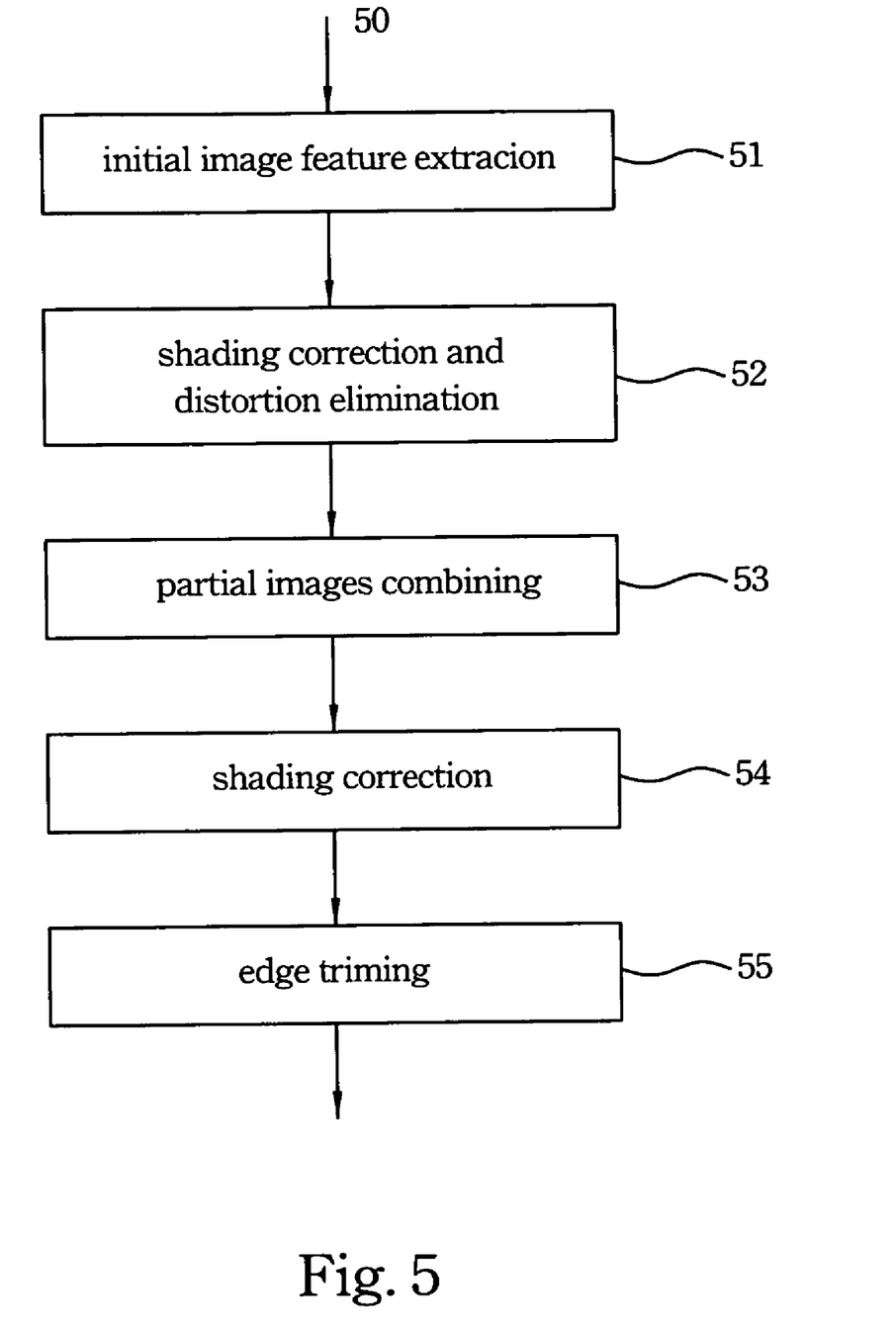
FIG. 5 schematically illustrates, with a block diagram, the image processing workflow of a scanner according to one embodiment of the present invention.
Figure 6:
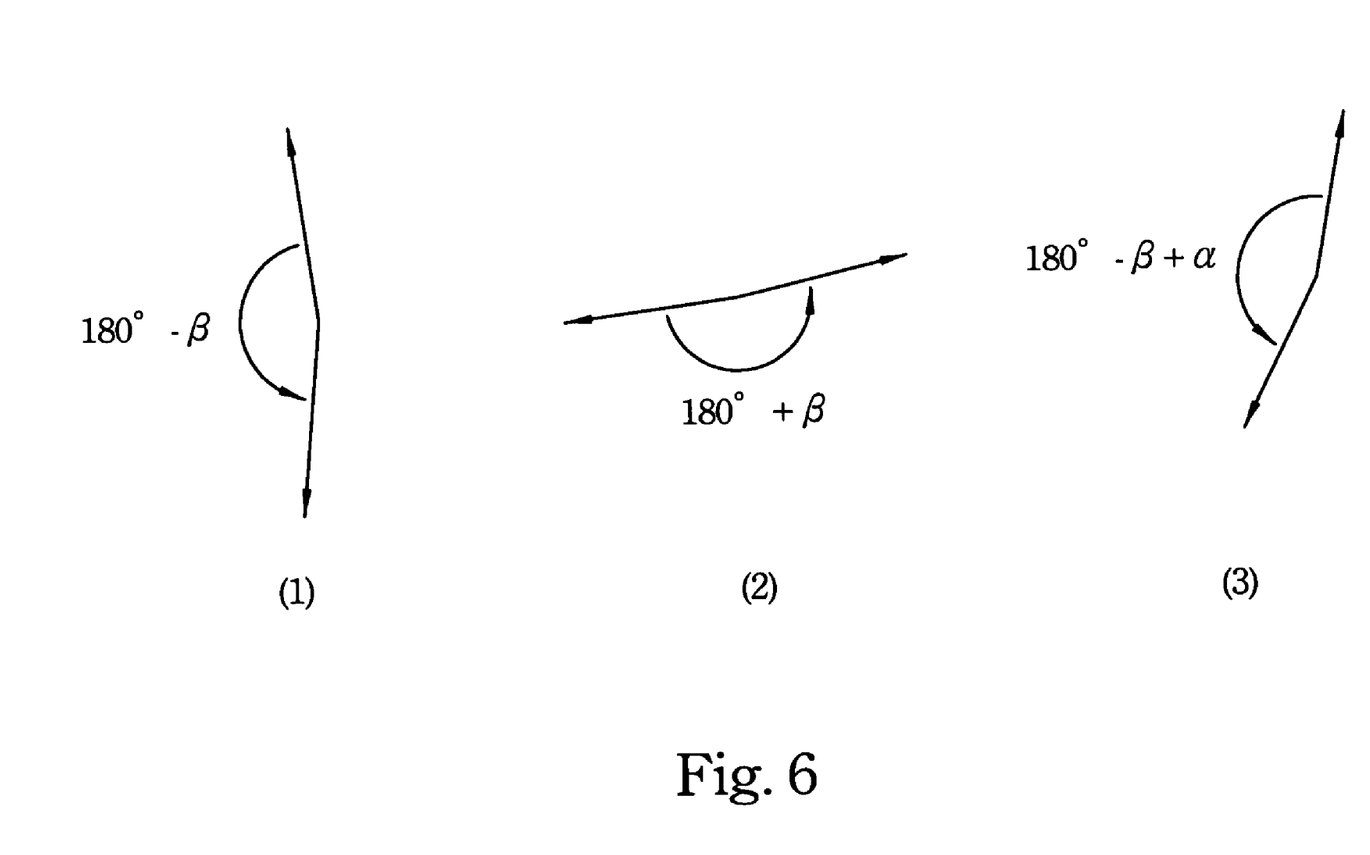

FIG. 5 schematically illustrates one embodiment of the workflow of the image processing system of the present invention. As shown in FIG. 5, when partial images are scanned into the system at entrance 50 of the system, the system initially extracts image features from the partial images at step 51. Features include information such as the positions of the marker images. The extracted features assist the system identify the amounts, locations, and the shapes of the image distortions as well as the distribution of the unevenness of the light intensity across the scanned image. The image processing system further does shading correction and distortion elimination on partial images at step 52. The distortion eliminated and shading unevenness corrected partial images are "stitched" together with the assistance of the images of the markers at step 53. Then, the shading correction is performed to ensure uniformity of the light intensity across the entire image at step 54. Finally, the white area, along with marker images, on the edge of the image is trimmed off at step 55. The above workflow of the image processing system can be arranged differently and can also include many other steps for improving the quality of the final processed image.

Referring to FIG. 2, in ideal situation, the platform 9 to hold the object to be scanned is a curved surface. However, in a practically useful device, platform 9 has a flat surface. Therefore, referring to FIG. 2, the optical system composed of platform 9, mirrors 7, 8, 5, 4, lens 3, and the image sensor 2 should be arranged to have a sufficient depth of field to allow the entire area of the top surface 76 of the platform 9 be in the depth of field of the above mentioned optical system.

Figure 10:
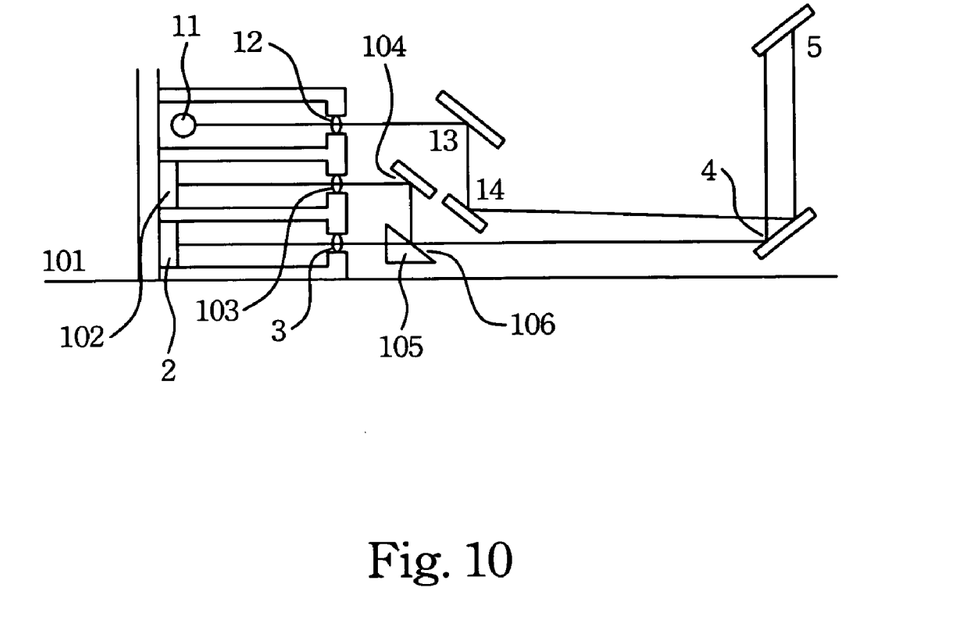
FIG. 10 shows a method to have two imaging heads, 101 and 102, with different best focus ranges to capture the same image by using of a beam splitter 105, with a semi-reflective and semi-transparent surface 106.
Figure 11:
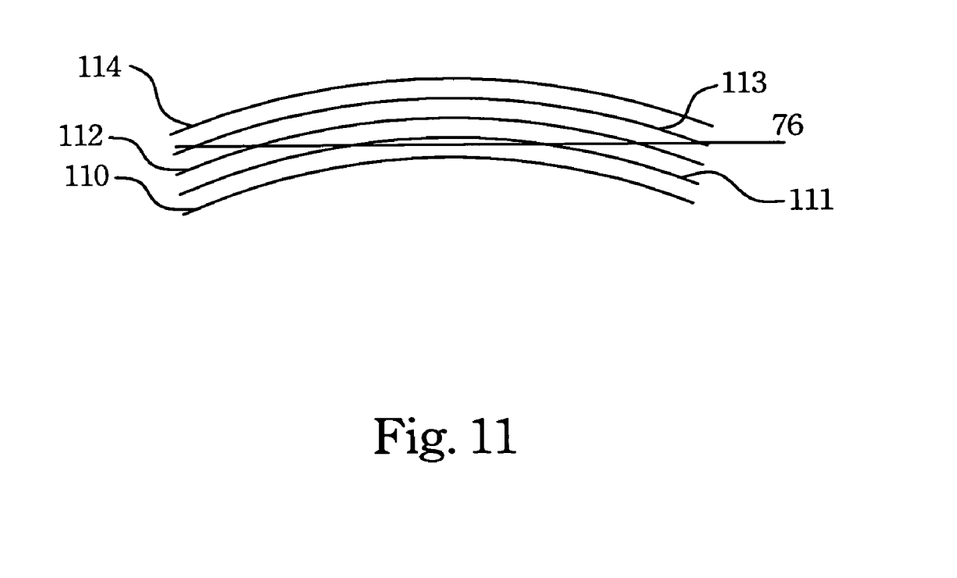
FIG. 11 schematically illustrates the different best focus ranges of the different imaging heads and the relationship with the top surface 76 of the at least partially transparent platform.

Referring to FIG. 10, additionally and optionally, a beam splitter 105 is placed on the image optical path.4-3. The beam splitter 105 reflects a portion of optical energy from the image to a mirror 104, and reflects off mirror 104 to a second focusing lens or lens assembly 103 and a second image sensor 102. Hereinafter lens 3 and image sensor 2 will be called imaging head 101 and lens 103 and image sensor 102 will be called imaging head 102. Referring to FIG. 11 and neglecting small distance errors, curves 110, 111, 112, 113, and 114 are all equal distance curves to the sensors in imaging heads 101 and 102. All objects in the range between curves 110 and 114 are in focus by either imaging head 101 or 102. The best focused distance for imaging head 101 is assumed to be at curve 111. All objects within the range between 110 and 112 are sufficiently in focus for imaging head 101, or in other words, are within the depth of field for imaging head 101, or in other words, are within the best focused range of imaging head 101. The best focused distance for imaging head 102 is assumed to be at curve 113. All objects within the range between curves 112 and 114 are sufficiently in focus for imaging head 102, or in other words, are within the depth of field for imaging head 102, or in other words, are within the best focused range of imaging head 102.

The two best focused ranges of the two imaging heads are next to each other in space. Any point on the top surface 76 of the at least partially platform 9 falls either in the best focused range of imaging head 101 or in the best focused range of imaging head 102. Therefore, the top surface 76 of the whole scan area is covered by and divided into two regions. One region falls in the best focused range of imaging head 101, hereinafter will be called the focusing region of imaging head 101, and another region falls in the best focused range of imaging head 102, hereinafter will be called the focusing region of imaging head 102.

The two images received by imaging head 101 and 102 need to be merged into one image. In merging the two images, if the scan is in the focusing region of imaging head 101, the image received by imaging head 101 dominates the merged image. If the scan is in the focusing region of imaging head 102, the images received by imaging head 102 dominates the merged image.

Let $v1(p)$ be the numerical value of the intensity of the electronic signal corresponding to the light intensity received in imaging head 101 for a particular point p on the object on platform 9 and let $v2(p)$ be the numerical value of the intensity of the electronic signal corresponding to the light intensity received in imaging head 102 for the same point p on the object on platform 9. A formula can be used to compute the signal value $v(p)$ of the merged image at point p, $v(p)=f(v1(p), v2(p))$, where f is a function of two variables. When p is in the focusing region of imaging head 101, value $v1(p)$ dominates the value of $v(p)$ and when p is in the region of imaging head 102, value $v2(p)$ dominates the value of $v(p)$. Here, domination means that the value of $v(p)$ is mainly determined by and is close or equal to the value of $v1(p)$ or $v2(p)$. An embodiment of f is $v(p)=v1(p)*(1-\theta(p))+v2(p)*\theta(p)$, where $\theta(p)$ is a function of p and $0 \leq \theta(p) \leq 1$. When p is in the focusing region of imaging head 101, $\theta(p)$ is close or equal to zero. When p is in the focusing region of imaging head 102, $\theta(p)$ is close or equal to 1.

This arrangement of using two imaging heads and the method to merge the two images obtained by the two imaging heads effectively doubles the depth of field of the whole device.

In another embodiment, the two imaging heads can be placed on the two sides, horizontally, of the rotatable mirror.

In still another embodiment, the two imaging heads can both be placed on one side, horizontally, of the rotatable mirror and the light source be placed on the other side, horizontally, of the rotatable mirror.

In general, let $k \geq 1$, if k imaging heads are used to capture the image of the same scan area and these imaging heads are arranged in the similar way as has been described above for imaging head 101 and 102, then the images obtained by these imaging heads can be merged as follows.

Let $vi(p)$ be the numerical value of the intensity of the electronic signal corresponding to the light intensity received in imaging head i for a particular point p on the object on platform 9, $i=1, 2, \ldots, k$. A formula can be used to compute the signal value $v(p)$ of the merged image at any point p on the top surface of the at least partially transparent platform, $v(p)=f(v1(p), v2(p), \ldots, vk(p))$, where f is a function of k variables. When p is in the focusing region of imaging head i, value $vi(p)$ dominates the value of $v(p)$. Here, dominates means that the value of $v(p)$ is mainly determined by and is close or equal to the value of $vi(p)$. An embodiment of f is $v(p)=v1(p)*\theta1(p)+v2(p)*\theta2(p)+ \ldots +vk(p)*\theta k(p)$, where $\theta i(p)$ is a function of p, $0 \leq \theta i(p) \leq 1$, when p is in the focusing region of imaging head i, $\theta i(p)$ is close to 1, $i=1, 2, \ldots, k$, and $\theta1(p)+\theta2(p)+ \ldots +\theta k(p)=1$.

When k imaging heads are used and each has a best focused range, and these best focused ranges are arranged to be next to each other, the combined best focused range of these k imaging heads have an effective depth of field approximately equal to the summation of the depth of fields of all the imaging heads.

The merged images from the first scan area and the second scan area are then combined into a complete image.

The image processing system can be implemented as firmware physically in the scan device, or implemented, completely or partially, as a software system resides and runs physically in a separate computer system outside the scan device.

While there has been shown several and alternative embodiments of the present invention, it is to be understood that certain changes can be made as would be known to one skilled in the art without departing from the underlying scope of the invention as is disclosed and set forth in the specification given above and in the claims given below. Furthermore, the embodiments described above are only intended to illustrate the principles of the present invention and are not intended to limit the scope of the invention to the disclosed elements.

Figure 12:
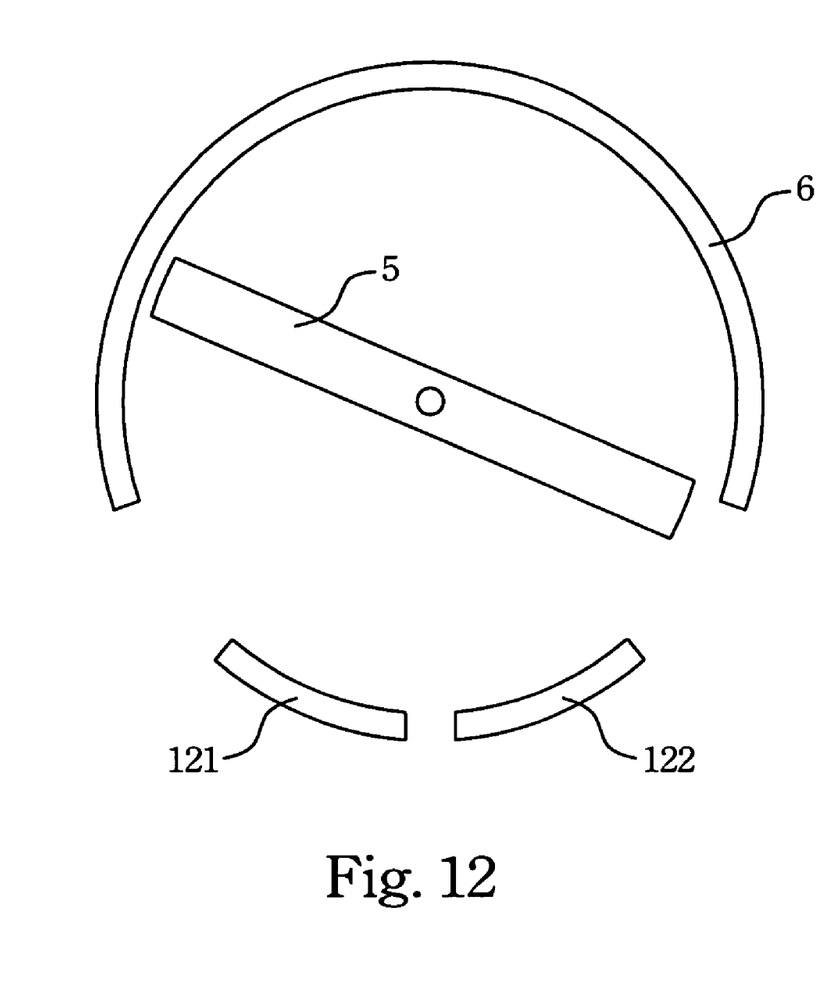
FIG. 12 schematically illustrates one embodiment of the structure of the hood of the rotatable mirror.

FIG. 12 schematically presents one embodiment of the non-transparent hood 6 for the rotatable mirror 5. The hood 6 is extended with additional non-transparent parts 121 and 122 to reduce the amount of scattered light in the scanner. The parts 6, 121, 122 can be coated with light absorbing material further reduce the amount of scattered light.

What is claimed is:

1. A scanner for obtaining an image of an object placed on an at least partially transparent platform, wherein the at least partially transparent platform has a first scan area and a second scan area, and each of the first scan area and the second area has a first edge and a second edge, respectively, comprising:
   a) at least one light source adapted for emitting an illuminating light;
   b) at least one rotatable mirror adapted for receiving the illuminating light from a first direction and reflecting the light to a second direction;
   c) a first flat or curved stationary mirror and a second flat or curved stationary mirror are placed near and on both sides of each rotatable mirror; for a full rotation of the rotatable mirror, the light from the second direction from the rotatable mirror is reflected off the first and the second stationary mirrors consecutively;

d) the light from the second direction is reflected off the first and second stationary mirrors, consecutively and respectively, to a third direction for scanning a partial image of the object on the first and second scan area, consecutively and respectively, of the at least partially transparent platform; the same stationary mirror receives image light of the object from a fourth direction and reflects the image light to a fifth direction; the image light from the fifth direction is reflected off the same rotatable mirror to a sixth direction;

e) at least one image sensor for receiving scanned partial images of the object from the sixth direction and outputting electronic signals corresponding to the received scanned partial images of the object; and f) an image processing system for receiving the electronic signals from the at least one image sensor and recording the electronic signals in a digital format;

wherein the at least one light source, the at least one rotatable mirror, the two stationary mirror on both sides of each rotatable mirror, and the at least one image sensor are arranged such that the first direction and the sixth direction define a first angle, $(180°-\beta)$, and the second direction and the fifth direction define a second angle, $(180°+\beta)$, and the third direction and the fourth direction define a third angle, $(180°-\beta-\alpha)$, where $\beta$ has a value in the range of $-20°$ to $20°$, and when rotated, the at least one rotatable mirrors causes the third direction of the light to change such that the light sequentially scans the partial images of the object from the first edge to the second edge of the first scan area along a first scan direction A and from the first edge to the second edge of the second scan area along a second scan direction B in one or more full rotation of the rotatable mirror; if the stationary mirror on the optical path between the second and the third direction is a planar mirror, $\alpha=0$; if the stationary mirror on the optical path between the second and the third direction is a curved surface mirror, then $-10°\leq\alpha\leq10°$ and variable during a scanning.

2. The scanner of claim 1, further comprising at least one focusing lens or lens assembly placed on an optical path between the at least one rotatable mirror and the at least one image sensor.

3. The scanner of claim 2, further comprising means to focus the illuminating light from the at least one light source into a narrow band of light beam.

4. The scanner of claim 2, further comprising a blocker placed on the optical path of the, strong direct reflection light, due to the principle of incidence angle equals to the reflection angle, of the illuminating light reflected off the top and bottom surfaces of the at least partially transparent platform, to block the strong direct reflection light from directly entering the image sensor.

5. The scanner of claim 2, further comprising rotating means for rotating the at least one rotatable mirror.

6. The scanner of claim 2, wherein the at least one rotatable mirror comprises a planar mirror or a polygon mirror having at least one reflecting surface.

7. The scanner of claim 2, wherein the at least partially transparent platform comprises a plate made of at least partially transparent single or composite layer material with at least one layer is rigid or semi-rigid.

8. The scanner of claim 7, wherein the at least partially transparent platform is coated with anti-reflective coating on one side or both sides of its surface.

9. The scanner of claim 2, which can be incorporated into copiers and multiple function peripherals as an image scan sub-system.

10. The scanner of claim 2, wherein k imaging heads, k>1, are used to receive the image light at exactly the same location on the at least partially transparent platform simultaneously at any moment during a scanning, by using at least one beam splitter to split the image optical path of the same image light into k optical paths leading into k imaging heads; wherein, a) each imaging head comprises a focusing lens or lens assembly and a line image sensor;

b) each imaging head has a best focused range that contains a portion on the top surface of the at least partially transparent platform of the scanner; the portion on top surface of the at least partially transparent platform representing the focusing region of the imaging head; the focusing region of i-th imaging head representing an i-th focusing region, $1\leq I\leq k$;

c) the entire area of the top surface of the at least partially transparent platform of the scanner is covered by and is divided by the k focusing regions.

11. The scanner of claim 10, wherein multiple images obtained by the multiple imaging heads are superimposed into one image, and the value v(p) of the signal intensity corresponding to the light intensity at any point p on the at least partially transparent platform in superimposed image is calculated by $v(p)=f(v1(p), v2(p), \ldots, vk(p))$, where vi(p) for $i=1, 2, \ldots, k$, is the value of signal intensity corresponding to the light intensity from the i-th imaging head at point p, and f is a smooth function whose value is mainly determined by and is close or equal to the value of vi(p) when p is in the i-th focusing region corresponding to vi(p).

12. The scanner of claim 11, wherein the function f is represented by $v(p)=v1(p)*\theta1(p)+v2(p)*\theta2(p)+ \ldots +vk(p)*\theta k(p)$, where $\theta i(p)$ is a smooth function of p, $0\leq\theta i(p)\leq1$, $\theta i(p)$ is 1 or close to 1 when p is in the i-th focusing region corresponding to vi(p), $i=1, 2, \ldots, k$, and $\theta1(p)+\theta2(p)+ \ldots +\theta k(p)=1$.

13. The scanner of claim 11, wherein when k=2, the function f is represented by $v(p)=v1(p)*(1-\theta1(p))+v2(p)*\theta(p)$, where $\theta(p)$ is a smooth function of p, $0\leq\theta(p)\leq1$, and $\theta(p)$ is 0 or close to 0 when p is in the first focusing region corresponding to v1(p) and $\theta(p)$ is 1 or close to 1 when p is in the second focusing region corresponding to v2(p).

14. The scanner of claim 1, wherein a light blocking hood of the rotatable mirror covers the rotatable mirror, leaving only space gap on the hood allowing imaging and illuminating light in and out of the hood in pre-determined ranges of angle.

* * * * *